United States Patent Office 2,818,348
Patented Dec. 31, 1957

2,818,348

MODIFIED IRON OXIDE PIGMENTS

Julius Jackson, Westfield, N. J., assignor to E. I. du Pont de Nemours and Company, Wilmington, Del., a corporation of Delaware No Drawing. Application April 7, 1954
Serial No. 421,703

9 Claims. (Cl. 106—304)

This invention relates to iron oxide pigment production and more particularly to new, modified iron oxide pigments which exhibit desirable intense yellow to reddish-yellow shades, high transparency, and excellent durability when formulated into coating compositions.

Inorganic iron oxide pigments varying in shade from yellow to deep red are already known and have been widely used as pigmenting ingredients in coating compositions such as paints, enamels and lacquers because of their relatively low cost and generally excellent durability in such compositions. Some of these products are found in nature, the pure oxides being red to black, whereas the ochres or hydrated oxides are yellow in color. Synthetic products of essentially the same compositions have also been manufactured, but such products, both natural and synthetic, have been of dull shade and very opaque, their widespread commercial use being largely due to their low cost.

In recent paint technology, the need has developed for pigments of relatively high transparency to take advantage of novel color effects which are possible when such transparent pigments are combined with flake metals such as flake aluminum in the formulation of finishes. Prior iron oxide pigments have been of little utility in such finishes because of their dullness and opacity, and a great need has therefore existed for desirably transparent and intense iron oxide pigments. Various unsuccessful expedients have been resorted to in efforts to obtain such products.

Freshly precipitated hydrous oxides exhibit a high degree of transparency. One approach to preserve this transparency entails a "flushing" of such products directly into the coating composition vehicle in accordance with the teachings of U. S. Patent No. 2,335,760. Some degree of transparency is advantageously retained by such an operation. Serious difficulties are encountered in this, however, for the transfer of the very hydrophilic pigment to the oil is difficult; the degree of transparency of the resulting finish leaves much to be desired; and the hydrated oxide, in paste form, tends to change in color as it ages, making reproducible shades difficult to obtain.

In U. S. Patent No. 2,384,579 the hydrous oxide is treated with large amounts of an emulsifying agent during the flushing operation. The presence of such emulsifying agent in the final product is undesirable, and the presence of the vehicle in the flushed color limits the formulator's control over the composition so that a dry color of similar properties is highly desirable.

It is among the objects of this invention to overcome the disadvantages characterizing prior iron oxide pigments, and to provide novel methods for attaining these objects. It is among the particular objects of this invention to provide novel modified iron oxide pigments in dry form which inherently possess desirable high transparency and intense color and have satisfactory durability, good gloss retention, and freedom from undesirable reactivity in the usual coating composition vehicles. A further object is to make these products by an easily operable and reproducible process from accessible raw materials of low cost. Other objects and advantages of the invention will be evident from the ensuing description.

The objects of this invention are attained by heating a precipitated hydrous ferric oxide in aqueous suspension with a petroleum sulfonic acid or salt, followed by flocculation of the highly dispersed pigment by treatment with a water-soluble salt of an organic cationic agent and subsequently filtering, washing, drying and recovering the desired dry form of pigment.

In a more specific and preferred embodiment, the invention comprises precipitating hydrous ferric oxide by adding an alkali to a solution obtained, for example, by oxidation of ferrous sulfate with, for instance, sodium chlorate under acidic conditions, heating the aqueous suspension obtained to just below the boil (at least 75° C.) in the presence of sufficient alkali metal (sodium) salt of a petroleum sulfonic acid to provide about one molecular equivalent of acid to each six atoms of iron, flocculating the dispersed pigment suspension by incorporating therein a solution of an organic cationic agent such as a diphenylguanidine salt, and then filtering, washing and drying the pigment.

In one practical adaptation of the invention, a relatively pure form of precipitated hydrous ferric oxide is heated in aqueous suspension, preferably under slightly acid conditions, with a treating agent comprising an alkali metal salt of an oil-soluble petroleum sulfonic acid having an average molecular weight of between 400 and about 475. Preferred types of treating agents comprise petroleum sulfonic acids or their salts which are by-products obtained in the purification of petroleum products with sulfuric acid. Both water-soluble and oil-soluble products are formed in such processes and can be used herein, but the oil-soluble fractions, sometimes called mahogany acids, are preferred for employment, usually in the form of their sodium salts which are water-dispersible. Such products may be relatively pure or they may contain substantial amounts (up to about 35%) of unsulfonated mineral oil. Thus, to a hydrous ferric oxide precipitate obtained in accordance with the disclosure of U. S. Patent No. 2,335,760, and preferably by oxidizing a solution of ferrous sulfate through treatment with sodium chlorate in the presence of sulfuric acid, followed by sufficient caustic soda addition to provide a final pH ranging from about 3–4, is added sufficient sodium salt of a petroleum sulfonic acid to give about 1 molecular equivalent of acid to each 6 atoms of iron, and preferably from 1 molar equivalent of petroleum sulfonic acid per 5 to 7 molecular equivalents of ferric hydrate. After heating for some time just below the boil, the highly dispersed suspension of the new pigment is flocculated by adding a solution of a minor amount of a cationic agent, preferably an organic base or quaternary compound, such as a diphenylguanidine salt, filtered, washed and dried at about 85° C.

The recovered dry pigment products of this invention will be useful in all types of pigmenting applications, especially in coating compositions, particularly those designed for use on automotive vehicles, wherein unusual beauty and transparent color effects are desired. Examples of such formulations include the types disclosed in U. S. Patent No. 2,335,760 and the accompanying examples. They meet a wide need for dry iron oxide type pigments of easy dispersibility in coating composition vehicles to give highly transparent enamels and lacquers which, when metallized as with aluminum powder, exhibit a very desirable brilliance and two-tone effect accompanied by high original gloss, good gloss retention and excellent durability when exposed to the elements. They are also advantageous in that they are made from readily available raw materials of low cost by a new and easily controlled process.

To a clearer understanding of the invention, the following specific examples are given, the parts mentioned being by weight:

Example I 278 parts of ferrous sulfate ($FeSO_4 \cdot 7H_2O$) is dissolved in 1000 parts of water to which is then added 18.6 parts of sodium chlorate ($NaClO_3$) and 49 parts of sulfuric acid (100% basis). This solution is heated to 82° C. and held at that temperature for about 30 minutes. To the resulting solution of ferric sulfate, a solution of 117 parts of caustic soda in about 500 parts of water is added slowly over a period of about 20 minutes. The pH after this addition should be between 3.0 and 5.0, preferably about 4.0. Slightly more or less alkali may be added to result in the desired pH of about 4.0. 117 parts of a commercial sodium petroleum sulfonate product containing about 52% of a sodium petroleum sulfonate with a molecular weight of about 415 (the remainder being mostly water) is then added to the hot precipitated hydrous ferric oxide suspension. (For convenience in handling, it may be desirable to dilute the sulfonate with an equal weight of water before adding to the oxide suspension.) Heating is then continued to a temperature of about 88° C. which is then maintained with good agitation for about 2 hours. The highly dispersed pigment suspension is then flocculated by adding a solution of 19 parts diphenylguanidine in 200 parts of water containing 30 parts of concentrated hydrochloric acid (about 9 parts 100% HCl). The pigment is then isolated by filtration and washing and is then dried at about 85° C. and finally pulverized to give a brownish powder which is readily dispersible with a minimum of work in coating composition vehicles to give highly transparent, rich, reddish yellow finishes which, after the addition of flake aluminum, for instance, exhibit the much-sought-after "flash" or two-tone effect when viewed at different angles. Furthermore, such finishes show excellent initial gloss and superior gloss retention on exposure to the elements, and are substantially free from reactivity or progressive increase in viscosity on aging when formulated from conventional enamel or lacquer vehicles.

Example II

Example I was duplicated, except that another type of sodium petroleum sulfonate, consisting of 107 parts of a product containing about 63% of a sodium petroleum sulfonate with a molecular weight of 440–470, about 32% mineral oil and about 5% water, is used in place of the 117 parts of the 52% product used in Example I. The resulting dry pigment has substantially the same properties as the product of Example I except that the presence of the mineral oil has a tendency to give an unctuous or greasy behaviour to the dry product which may be desirable from the standpoint of ease of dispersion in a vehicle but undesirable in respect to its tendency to cake on storage as a dry pigment.

Example III

A ferric sulfate solution is prepared as in Example I from 278 parts of ferrous sulfate ($FeSO_4 \cdot 7H_2O$). 117 parts of a sodium petroleum sulfonate product like that used in Example I is then added to the hot ferric sulfate solution and heating is continued to a temperature of about 88° C. and the mixture is held at that temperature for about 30 minutes whereupon 585 parts of a 20% solution of caustic soda is added over a period of about 20 minutes to give a final pH of about 4.5. The temperature is again adjusted to about 88° C. and the slurry is held at that temperature with good agitation for about 2 hours. A solution containing 19 parts of diphenylguanidine in 200 parts of dilute HCl (about 9 parts 100% HCl) is then run in and the flocculated suspension is filtered, washed, dried and pulverized as in Example I. The properties of the resulting product are very similar to those of the product described in Example I except that the color is considerably more yellow.

Example IV

This example illustrates the use of a separately prepared paste of hydrous ferric oxide which can be made following the teachings of U. S. 2,335,760 and stored in paste form.

About 320 parts of such a paste, containing about 30% solids (about 95 parts $Fe(OH)_3$), is thoroughly mixed to a smooth slurry with about 2000 parts of water. Sufficient sulfuric acid as a dilute (about 5% solution) is then added to give a pH in the range of 3–6 with preference being given to the lower part of the range (3–4). 119 parts of the sodium petroleum sulfonate (52% purity) of Example I, diluted with about 120 parts of water, is then added and the mixture heated to about 88° C. and maintained at that temperature with good agitation for about 2 hours. The hot slurry is then treated with a solution of 10 parts diphenylguanidine in 100 parts of water containing 15 parts of concentrated HCl, filtered, washed, and dried to give, after pulverization, a reddish-brown powder which is readily dispersible in an enamel vehicle. The resulting coating composition has the same desirable properties set forth above under Example I.

Example V

To demonstrate the valuable properties of the pigment of this invention, it can be formulated into a typical enamel coating composition comprising the following ingredients:

|  | Parts |
| --- | --- |
| Modified iron oxide pigment | 30 |
| Short oil alkyd resin (50% solution) | 216 |
| Modified melamine formaldehyde resin (60% solution) | 20 |
| Aromatic hydrocarbon solvent | 40 |
| Aliphatic hydrocarbon solvent | 40 |
| Manganese naphthenate drier (6% solution) | 0.2 |
| Aluminum paste (80% solids) | 2 |
|  | 348.2 |

This enamel can be prepared by any customary paint grinding technique, as by grinding the pigment in a ball mill with a portion of the alkyd resin and thinners, after which the remainder of the ingredients can be added and stirred to complete homogeneity. The new pigment of this invention is so readily dispersible that, for many uses, no grinding is necessary and it may be simply stirred into the thinner followed by stirring in of the remaining ingredients.

By either procedure a highly transparent golden-brown enamel results which, when used as a coating composition, exhibits a very desirable "two tone" or flash and excellent durability when exposed to the elements.

Example VI

A typical nitrocellulose lacquer, using the new pigment of this invention, can be made up of the following ingredients:

|  | Parts by weight |
| --- | --- |
| Modified iron oxide pigment | 3.5 |
| Cellulose nitrate—½ sec. visc | 15.4 |
| Non-drying alkyd resin (60% solution) | 7.1 |
| Dibutyl phthalate | 2.5 |
| Castor oil | 2.5 |
| Active solvents | 33.0 |
| Alcohols | 17.8 |
| Aromatic hydrocarbon | 18.2 |
|  | 100.0 |

A common method of preparing such a lacquer is to disperse the pigment in the resin-plasticizer portion of the composition together with sufficient solvent to permit working the mass in a ball mill or other grinding device. The remaining ingredients are then incorporated by simple agitation. The dispersion of the pigment may also be done in other ways known for the preparation of nitrocellulose lacquers such as by plastic milling on a 2 roll mill or by flushing from an aqueous paste of the pigment, as for instance in U. S. 2,140,745.

A metallized lacquer can be prepared from the above lacquer by adding thereto sufficient flake aluminum to give 5 parts of aluminum per 95 parts of modified iron oxide pigment. This metallizer lacquer will exhibit the same desirable properties of the enamel of Example V.

The hydrous ferric oxide treated herein can be obtained from ferrous sulfate which is available in relatively pure form in large quantities, for instance, as a by-product in the manufacture of titanium oxide pigments, or as a by-product from pickling operations in the removal of scale, etc., from iron structures. As noted, the ferrous sulfate may be easily oxidized to the ferric state in a conventional manner as by treatment with sodium chlorate under acid conditions. However, there is nothing critical about its use and any available iron salt can be used. If the salt is in the ferrous state it must be oxidized to the ferric state which can be accomplished by any well-known method except that, to obtain the desired products of this invention, the oxidation to the ferric state should precede the precipitation of the hydrous oxide. It is equally possible to use any available ferric salt, such as ferric chloride or ferric sulfate, as the starting point of the process. Also, the product "hydrous ferric oxide" is not pure $Fe(OH)_3$ but contains more or less of the anion in the iron salt used in the manufacture. Thus, the product prepared in Example I by the caustic soda precipitation of the ferric sulfate actually contains some sulfate ion and could perhaps be described as a basic iron sulfate. This phenomenon of the retention of some of the anion in hydrous metal oxides is well known and such products are contemplated within thes cope of the term "hydrous ferric oxide," as used and claimed herein.

The precipitation of the hydrous oxide may take place under a variety of conditions. Although the use of caustic soda (NaOH) has been shown in the examples, other alkaline agents such as sodium carbonate or ammonium hydroxide can also be used and may actually be preferred under some conditions. It is already known in the art that variations in the alkali used, the pH of precipitation and the addition of small amounts of other metallic salts may be employed to control the color of precipitated hydrous ferric oxides and these same points of control will be apparent to those skilled in the art, since, to a very large extent, the hue of the resulting pigment is controlled at the point of precipitation. The examples have shown the addition of the alkali to the iron salt but the reverse procedure in which the iron salt is added to the alkali may also be used and may be preferred under some conditions. In general, the pH after precipitation should be in the range of 4-6, with a pH of about 4.5 being the normally preferred point. Hydrous ferric oxide is completely precipitated at this point and further additions of alkali are not needed for the practice of this invention. It is possible, however, to carry the precipitation over to the alkaline side with acceptable results and it is not meant to exclude such operations.

The agents used in this invention to advantageously modify the hydrous ferric oxide are of two related types, both being alkali metal (sodium, ammonium, potassium, lithium) salts of sulfur-containing acid groups attached to hydrocarbon radicals of from about 10 to 30 carbon atoms, or the corresponding free acids. These types differ in that the one type has the acid group attached to the hydrocarbon radical through a carbon-sulfur bond with the general formula $R\text{---}SO_3H$ which is a true sulfonic acid, whereas the other type comprises the half ester of sulfuric acid ($R\text{---}OSO_2H$) obtained as the product of a reaction between a long chain alcohol and sulfuric acid.

The preferred agents are of the first type in which the hydrocarbon radical is believed to comprise a long chain aliphatic radical, which may be unsaturated, attached to an aromatic-naphthenic nucleus with the sulfonate group attached to the aromatic portion of the molecule. The empirical formula of the sodium salt is $C_nH_{2n-10}SO_3Na$ where $n$ may vary from about 20–30 and the molecular weight is in the range of about 350–475. Typical of such preferred agents are the sodium salts of the so-called mahogany acids which are the oil-soluble fractions resulting as by-products from the purification of petroleum oils with sulfuric acid. Such products are often given the generic name of sodium petroleum sulfonates and are usually available dispersed in more of less water as liquid products. Some commercial forms also contain substantial amounts of mineral oil (up to 35%) and these are also successfully used in this invention.

Examples of the other type of agent ($R\text{---}OSO_3H$) are readily available and widely used as commercial detergents and, although usable in this invention, are not preferred because of relatively high cost and some less desirable properties in the final product.

The point and manner of addition of the petroleum sulfonate agent is not critical to the invention but it is a variable which affects the properties of the final pigment. For the most desirable transparency and color, for the best control of the process, and for the most economical operation, it is preferred to add the agent to the reaction mixture containing the freshly precipitated hydrous ferric oxide, to adjust the pH to about 4.0, and to digest the slurry for the desired time at an elevated temperature. However, it is possible to add the agent to the ferric salt solution prior to the precipitation of the hydrous oxide. Products so made are yellower than products made in the preferred manner but the other properties are essentially the same and such products may be desired for some purposes. On the other hand, a separately prepared and isolated hydrous ferric oxide such as that which might be used without further treatment as a pigment paste may also be treated with the petroleum sulfonate salt after proper redispersion at a water slurry.

In all cases it is desirable for the best results, particularly color and yield, that the hot digestion of the reaction mixture be carried out under slightly acid conditions. The operable pH range is about 3.0–6.0 and the preferred range is about 3.5–4.5. Though a somewhat higher pH even slightly alkaline and up to 9.0 can be used when the hydrous oxide is freshly precipitated, the yield and the color of the product suffer in comparison to operation on the acid side. Furthermore, these undesirable effects of high pH become very pronounced when one attempts to use a separately prepared and aged hydrous oxide.

The hot digestion requires a temperature of at least 75° C. and a duration of at least 1 hour and up to about 3 hours. The preferred temperature is about 85° C.–90° C. held for about 2 hours. With lower temperatures the time required will increase somewhat but higher temperatures, up to the boil, though utilizable, do not result in any significant reduction in the time requirement and, hence, are uneconomical for use.

At this point in the operation, the product is very highly dispersed in the aqueous slurry and can be isolated only with great difficulty, if at all. In order to flocculate it, a solution of a salt of diphenylguanidine is added. This reacts with and becomes an essential part of the resulting product which is then readily isolated by filtering, washing free of soluble salts, and drying. The type of agent required by this operation is believed to be somewhat critical. It must be an agent with a high-molecular-weight organic cation, preferably an organic nitrogen base such as an amine or a quaternary ammonium compound. In addition to diphenylguanidine, one may use other guanidine derivatives, long chain amines such as lauryl amine, stearyl amine and the like, or quaternary salts such as lauryl trimethyl ammonium chloride and similar compounds with various hydrocarbon radicals. Many such amines and quaternary compounds are derived from natural fats and comprise mixtures of various chain lengths rather than pure compounds. The amines, such as diphenylguanidine, or lauryl amine, are soluble only as their salts in dilute acid and require such solution for effective use. The quaternary compounds are generally water soluble or dispersible and may be dissolved directly for use.

The amount of flocculating cationic agent needed is relatively small and is in the range of about 25% of the weight of the sodium petroleum sulfonate used (100% basis). Amounts less than about 15% may not give complete flocculation while amounts substantially in excess of about 30% offer no added advantage and the excess is simply washed out and lost. Hence, the use of amounts ranging from 15% to 30% usually suffice for most practical purposes.

Whether the products of this invention comprise true chemical compounds or are hydrous ferric oxides in which the surface of the amorphous particles has been modified by the presence of adsorbed petroleum sulfonate cannot be presently stated. In U. S. 2,575,347 it is considered that hydrous ferric oxide is a "polymer" comprising a chain of repeating

groups in which, in a chain of more than 3 such groups one —OH group may be replaced with the fatty acid radical. Certain evidence is offered to prove the presence of "polymers" including the absence of any freezing point depression or of any evidence of a Tyndall cone in solutions of the material. The products of this invention contain, statistically, about one petroleum sulfonate radical for 6 atoms of iron, and they are "soluble" or at least very highly dispersible in organic solvents. They do, however, show a Tyndall cone and a freezing point depression which approximates, in order of magnitude, a molecular weight similar to that which could be calculated for a chain of about 6 of the above groups with one petroleum sulfonate radical attached. Such evidence favors the concept of a compound. Whether both compound formation and surface-treating effects are involved, it is clear that the process of this invention results in some intimate association of the hydrous ferric oxide and the petroleum sulfonate which is further improved by the presence of the cationic agent and which cannot be achieved by the simple addition of the agents to any dry form of an untreated ferric hydrate nor can it be achieved by including the separate components together in the preparation of a paint or other coating.

I claim as my invention:

1. A process for preparing a modified hydrous ferric oxide pigment which comprises hot digesting for at least one hour and up to about 3 hours at a temperature of from 75° C. to below the boil and at a pH of from 3–9 precipitated hydrous ferric oxide in the presence of a sulfur-containing compound selected from the group consisting of $RSO_3H$ and $R—O—SO_2H$ and their corresponding lithium, sodium, potassium, and ammonium salts wherein R is an aliphatic-aromatic hydrocarbon radical, containing at least 10 carbon atoms, employing one molecular equivalent of said sulfur-containing compound per 5–7 molecular equivalents of ferric hydrate under treatment, and thereafter treating the resulting product with a small amount of an organic nitrogen base cation-active flocculating agent.

2. A process for preparing a modified hydrous ferric oxide pigment comprising heating for at least one hour and up to about 3 hours at a temperature of from 75° C. to below the boil and at a pH of from about 3–9 precipitated ferric oxide in aqueous suspension in the presence of sufficient alkali metal salt of a petroleum sulfonic acid to provide about 1 molecular equivalent thereof to each 6 atoms of iron present in said oxide and flucculating the dispersed pigment suspension by incorporating therein a small amount of an organic nitrogen base cationic flocculating agent, and recovering the resulting product in dry state.

3. A method for producing a modified hydrous ferric oxide pigment comprising hot digesting for at least one hour and up to about 3 hours at a temperature of from 75° C. to below the boil and at a pH of from 3–9 precipitated hydrous ferric oxide in the presence of an oil-soluble petroleum sulfonic acid having an average molecular weight between about 350 and about 475, employing one molecular equivalent of petroleum sulfonic acid per 5–7 molecular equivalents of ferric hydrate under treatment, and thereafter flocculating the dispersed pigment suspension by means of a small amount of an organic quaternary ammonium cationic agent addition.

4. A method for producing a modified hydrous ferric oxide pigment which comprises digesting the freshly precipitated hydrous oxide at temperatures ranging from 75–90° C. for a period of from 1–3 hours in the presence of the sodium salt of petroleum sulfonic acid in amount ranging from 1 molecular equivalent of acid to each 6 atoms of iron, during said digestion maintaining the mixture at a pH of from 3.0–6.0, and thereafter flocculating the digested suspension by adding thereto a solution of a salt of diphenylguanidine and isolating and recovering the pigment product in dry state.

5. A modified hydrous ferric oxide pigment consisting essentially of an intimate association of (1) a hydrous ferric oxide, (2) an organic, nitrogen-base, cation-active flocculating agent, and (3) a sulfur-containing compound selected from the group consisting of $RSO_3H$ and $R—O—SO_2H$ and their corresponding lithium, sodium, potassium and ammonium salts, wherein R is an aliphatic-aromatic hydrocarbon radical containing at least 10 carbon atoms, said hydrous ferric oxide being present in an amount of 5–7 molecular equivalents for each molecular equivalent of said sulfur-containing compound and said flocculating agent being present in an amount of from 5–30% by weight, based on said sulfur-containing compound.

6. A modified hydrous ferric oxide pigment consisting essentially of an intimate association of a hydrous ferric oxide, an oil-soluble petroleum sulfonic acid, and an organic, nitrogen-base, cation-active flocculating agent, said hydrous ferric oxide being present in an amount of 5–7 molecular equivalents for each molecular equivalent of said sulfonic acid and said flocculating agent being present in an amount of from 5–30% by weight, based on said sulfonic acid.

7. A modified hydrous ferric oxide pigment consisting essentially of an intimate association of a hydrous ferric oxide, an alkali metal salt of petroleum sulfonic acid having an average molecular weight of between about 350 and 475, and an organic, nitrogen-base, cation-active flocculating agent, said alkali metal salt being present in an amount of 5–7 molecular equivalents for each molecular equivalent of said alkali metal salt and said flocculating agent being present in an amount of from 5–30% by weight, based on said alkali metal salt.

8. A modified hydrous ferric oxide pigment consisting essentially of an intimate association of a hydrous ferric oxide, a sodium-petroleum sulfonate and diphenyl guanidine, said ferric oxide being present in an amount of 5–7 molecular equivalents for each molecular equivalent of said sulfonate, and said diphenyl guanidine being present in an amount of from 5–30% by weight, based on said sulfonate.

9. A modified hydrous ferric oxide pigment consisting essentially of an intimate association of a hydrous ferric oxide, a sodium-petroleum sulfonate having an average molecular weight between 350 and 475, and diphenyl guanidine, said ferric oxide being present in an amount of 5–7 molecular equivalents for each molecular equivalent of said sulfonate, and said diphenyl guanidine being present in an amount of from 5–30% by weight, based on said sulfonate.

References Cited in the file of this patent

UNITED STATES PATENTS

| | | |
|---|---|---|
| 1,996,391 | Straus | Apr 2, 1935 |
| 2,092,750 | Brizzolara et al. | Sept. 14, 1937 |
| 2,192,954 | Sloan et al. | Mar. 12, 1940 |
| 2,220,952 | Brill | Nov. 12, 1940 |
| 2,282,006 | Sloan | May 5, 1942 |
| 2,335,760 | Hucks | Nov. 30, 1943 |
| 2,357,096 | Fireman | Aug. 29, 1944 |
| 2,419,512 | Vesce | Apr. 22, 1947 |

FOREIGN PATENTS

| | | |
|---|---|---|
| 517,476 | Great Britain | Jan. 31, 1940 |